Feb. 22, 1955   R. M. SCOTT   2,702,632
PARTICLE CLASSIFICATION
Filed June 18, 1949   3 Sheets-Sheet 2

INVENTOR.
RODERIC M. SCOTT
BY Hugo G. Kenman
ATTORNEY

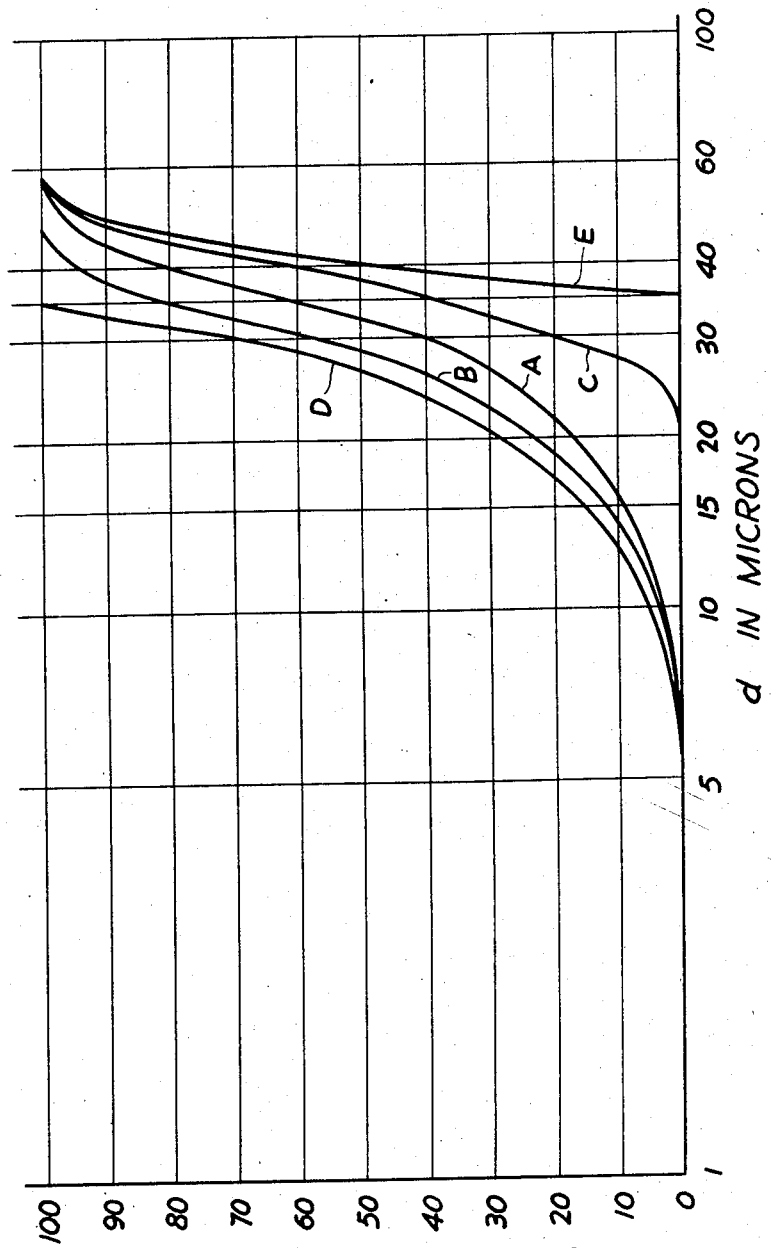

United States Patent Office 2,702,632
Patented Feb. 22, 1955

2,702,632

PARTICLE CLASSIFICATION

Roderic M. Scott, Wynnewood, Pa., assignor to The Sharples Corporation, a corporation of Delaware Application June 18, 1949, Serial No. 100,023

11 Claims. (Cl. 209—144)

This invention relates to an improved method and apparatus for separating or classifying particles of matter, particularly solid particles and powders, and more particularly powders containing particles below sieve size.

The present invention is applicable to the separation or classification of solid particles or liquid droplets dispersed in a fluid medium, either liquid or gas. Accordingly, the term "particles" will be used to mean finely divided particles of solid material or liquid droplets.

In the present description it is convenient to refer only to the size of the particles as effecting their separation characteristics, but it is apparent that the separation characteristics of particles depends not only on the size of the particles, but also on their density and shape. For the sake of convenience, the term "size" is used in the description of the invention to embrace density and shape.

I have provided a method of separating or classifying a mixture of finely divided particles which comprises imparting rotary motion to a fluid, passing the rotating fluid into the outer region of a circumferential classifying zone preferably so shaped as to have end walls which converge from a generally round periphery toward the center of the zone, adding the feed mixture of particles to the rotating fluid in any desired manner, such as, within the zone or prior to its entry therein, passing the resulting rotating suspension through the classifying zone in the form of a spiral vortex spiralling inward from the periphery toward the center of the zone, drawing off the separated coarse particle fraction of the feed mixture from the periphery of the spiral vortex, passing the rotating suspension of the fine particle fraction remaining in the fluid in the central portion of the spiral vortex out of an annular opening preferably concentric with the axis of rotation and opening into a centrifugal cyclone collector, separating and recovering the fine particle fraction separated from the rotating fluid in the collector, and preferably passing the separated rotating fluid back to the starting point in the cycle to be again set to rotating at about the original rate.

I prefer to use a mechanical bladed impeller or a pump for liquids, to produce the rotary motion in the fluid, because accurate control of the rate of rotation of the fluid can be had by varying the rate of rotation of the impeller or the pumping rate. I can also use an outside impeller or pump and introduce the fluid tangentially into the classifying zone.

I also prefer to set the particle feed mixture in rotation in the same direction, and preferably at about the same speed as the direction and speed of rotation, respectively, of the main body of rotating fluid, before introducing the feed mixture into the fluid rotating in the spiral vortex; preferably through an annular opening intermediate the periphery and the annular outlet of the spiral vortex in the classifying zone, as will be described in more detail later. Introduction of the feed mixture to the fluid in this manner results in obtaining a sharp and efficient separation of the feed mixture into the desired fine and coarse particle fractions because there is produced a minimum of turbulence and interference in the rotary motion of the fluid in the spiral vortex in the classifying zone.

To conserve space and the rotary motion of the suspension of fine particles in the rotating fluid leaving the spiral vortex through the annular outlet of the classifying zone, I prefer to locate the centrifugal cyclone collector adjacent the annular outlet in a manner to streamline the flow of the rotating fluid from the spiral vortex into the collector, as will be described in more detail below. In addition, I prefer to have the exhaust fluid from the collector lead directly through a straight, short conduit into the impeller or pump employed to produce rotary motion in the fluid at the beginning of the cycle to conserve space and any residual rotary motion remaining in the fluid being discharged from the collector.

I have also provided an apparatus for carrying out the method of the invention. A preferred embodiment of the apparatus comprises a cylindrical casing, in one end of which, such as the upper, is coaxially mounted a centrifugal blower having an impeller with blades shaped to impart the desired degree of rotational velocity to the discharged fluid. In the other end of said casing, such as directly beneath the blower, and preferably coaxially therewith, is mounted a classifying chamber having juxtaposed, such as upper and lower, confining walls converging from adjacent the casing wall toward the center of the chamber. Near the center of the chamber is an annular opening preferably centered on the axis of the casing opening, such as vertically downward, directly into a centrifugal cyclone collector which is preferably equidiameter and preferably disposed coaxially with the casing. The fluid outlet of the collector is preferably concentric with the annular outlet of the classifying chamber and is preferably coaxial with the blower with which it communicates through a conduit. This conduit is preferably short and straight and of relatively large diameter to avoid appreciable frictional resistance to fluid flow.

Opening through a wall of the classifying chamber, such as the upper, and intermediate the periphery and the central annular opening, and preferably concentric therewith is a preferred annular feed passage preferably having its inner wall on a bias with respect to the axis of the classifying chamber. The coarse and the fine particle collectors are likewise preferably coaxially arranged with respect to the casing and the separating chamber.

Referring now to the drawings.

Figure 1:
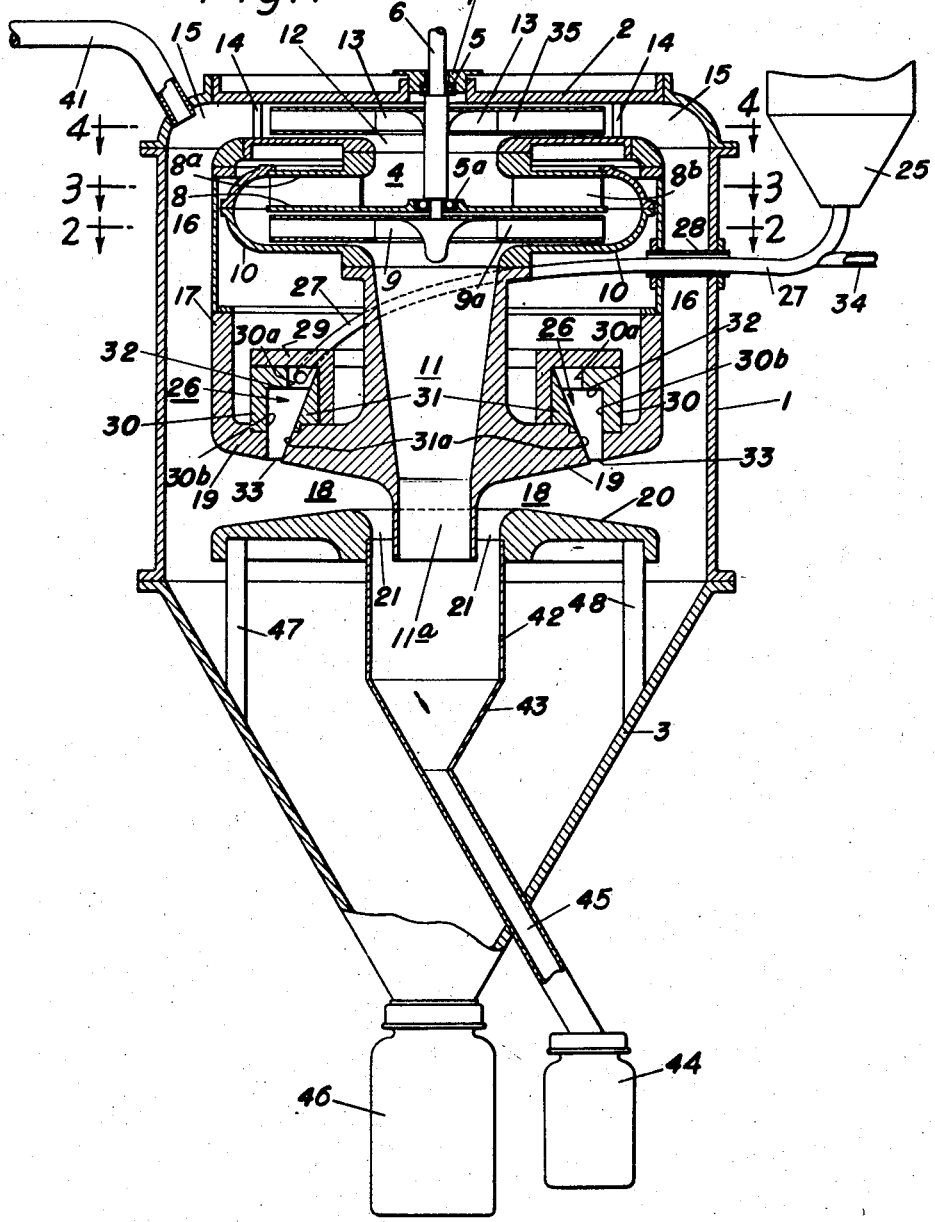
Figure 1 is a vertical section of an embodiment of the appartus of the invention.
Figure 2:
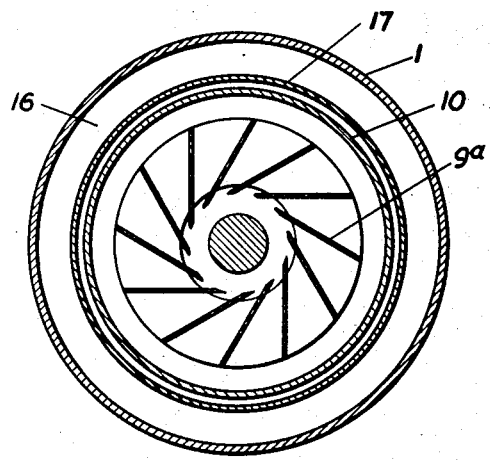
Figure 2 is a sectional plan view taken along the line 2—2 of Figure 1.
Figure 3:
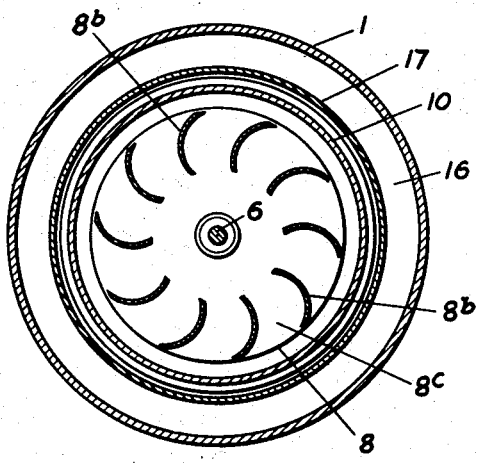
Figure 3 is a sectional plan view taken along line 3—3 of Figure 1.

Figure 5 presents particle size distribution curves of a feed powder and various fractions thereof produced by classification.

A classifier cosstructed in accordance with a preferred embodiment of the present invention is provided with an outer cylindrical casing 1 having a cover 2 and a funnel-shaped bottom 3 which forms the collecting surface for the coarse fraction. A two-stage blower 4 having a vertical axis and journaled on bearings 5 and 5a, is driven through shaft 6 by an electric motor or other suitable means (not shown). Bearing 5 is mounted in cover 2 by means of collar 7, whereas bearing 5a is mounted on a stationary circular plate 8 suitably supported, such as by bolts (not shown) from the upper portion 8a of the internal housing 10. Fluid straightening vanes 8b are positioned between plate 8 and upper portion 8a to form a plurality of radially extending passages 8c through which a fluid, which will be referred to as air for the sake of convenience, is forced after discharge from the periphery of the first-stage impeller 9. The stationary vanes 8b are curved blades which function as straightening vanes and convert the rotating air from impeller 9 into relatively static air of increased pressure. Impeller 9 is positioned in internal housing 10 which communicates with the coaxial passage 11, thus forming an intake for the first-stage impeller 9. Internal housing 10 has a restricted outlet 12 which forms an outlet for passages 8c and an intake passage for the second-stage impeller 13. Impeller 9 and vanes 8b acting together on the air produce static pressure in the air being fed into impeller 13. This air is discharged from impeller 13 and passes in a radially outward path to the upper edge of housing 1, thence downwardly around bend 15 through an annular passage 16 formed between the periphery of the assembled inner structure 17 and the inside of casing 1. As shown, the assembled inner structure 17 is supported from cover 2 by bolts 14.

The air or other suitable fluid carrier of the particles flows in vortex fashion from annular passage 16 into the classifying zone which is defined by the walls of an upper classifying chamber member 19, and an opposite lower chamber member 20.

The walls of members 19 and 20 are usually, though not necessarily, similarly shaped, and each wall preferably takes the shape of a surface of revolution defined by revolving a line about the axis of the classifying zone, said line intersecting said axis at or near the theoretical center of said zone. Said line may be straight, so as to give the wall a generally frusto-conical shape, except for the opening at the center, or may be a section of the circumference of a circle so positioned that its diameter is coincident with the axis of the classifying zone. The latter gives the wall a shape, except for the opening at the center, such as that obtained by passing a plane through a sphere, and is generally referred to as a section of a sphere. Shapes intermediate those above defined may be employed, the theoretically perfect shape being that of a paraboloid having its axis coincident with the axis of the classifying zone, and having an opening at the center to provide the desired outlet for the classifying zone.

For convenience in description the terms "frusto-conical," "frusto-spherical" and "frusto-paraboloidal" will be employed to described the shapes included between two parallel planes passing through a cone, a sphere and a paraboloid, respectively, at right angles to the axis thereof, which in the case of a cone is the altitude, in the case of a sphere is the diameter, and in the case of a paraboloid is the axis of rotation.

As pointed out above, members 19 and 20 may be frusto-conical, frusto-paraboloidal, frusto-spherical, or of intermediate shape, the choice being largely guided by the results desired and the material to be classified. The characteristic feature of the classifying zone is, however, the fact that the distance between opposing members 19 and 20 at their peripheries is greater than the distance between the members at the inner terminus of the classifying zone. This convergence provides increasing fluid velocity from the periphery to the axis of the classifying zone, and is so proportioned in the preferred form for a predetermined particle size that, at some point or region in the classifying zone, the drag force tending to carry particles of that size radially inward is preferably kept substantially equal to the centrifugal force, incident to the rotational velocity of the fluid, which tends to carry particles of that size radially outward. By means of a careful regulation and determination of the fluid viscosity, and/or fluid flow, and/or the shape of the walls of the classifying zone, the operation may be so adjusted that the drag force for a particle of the critical size is substantially equal to the centrifugal force for such a particle throughout at least a portion of the classifying zone. Thus it will be apparent that for particles larger than the critical size the centrifugal force will predominate, and such particles will be discharged radially outward to fall over the outer edges of member 20 due to gravity; whereas particles smaller than the critical size will be carried radially inward to find their way into the axial downwardly extending annular passage 21 in member 20. It will be understood from the foregoing that the present classifier is adapted to be used with a classifying zone constructed in accordance with the teaching of copending application, Serial No. 23,015, filed April 24, 1948, by Malcolm H. Hebb, now Patent No. 2,616,563, granted November 4, 1952, but the features of my classifier are not broadly limited to use with such a classifying zone.

Aggregate to be fed is placed in hopper 25 located, if desired, exteriorly of the classifier assembly and communicating with an annular passage 26 by means of conduit 27 which extends through casing 1 and structure 17 by means of a bushing 28. Passage 26 is defined by an annular flanged cap 29 which provides the roof of the passage, an annular flanged ring 30 which forms the dual outside walls 30a and 30b of passage 26, and an inside annular member 31. The outer periphery of member 31 is biased with respect to the axis of the classifier and forms at least a part of the inside sloping wall 31a of passage 26. Outer walls 30a and 30b are radially spaced at different lengths from the axis of the machine and the difference in the two walls in effect provides a step 32 over which the materials traverse in their course through passage 26. Passage 26 terminates at its lower end in a restricted annular opening or orifice 33.

A small air line 34 is connected to conduit 27 in order to provide sufficient air to carry the aggregate from hopper 25 to passage 26. Conduit 27 enters passage 26 tangentially, as shown in Figure 1, so that the particles have substantial rotational velocity as they downwardly traverse chamber 26 and also at the time they enter the classifying zone through orifice 33. The configuration of passage 26 assists in distributing the aggregate more uniformly and completely around the classifying zone, thereby reducing concentration at any point and increasing the capacity of the machine. As it is discharged from conduit 27 into passage 26, the aggregate is directed against upper outside wall 30a which is of relatively smaller diameter. The particles then slide downwardly over step 32 and then flow radially outward until they impinge against the lower outside wall 30b of passage 26 which, as stated above, is of greater diameter than 30a. The particles thence continue to slide downwardly, partially under the influence of gravity and partially due to the downward air flow, until they enter the classifying zone 18 through the annular orifice 33 in member 19. Since the air and solids are rotating as they enter the classifying zone 18, there is a tendency for the solids to move in a downward and outward direction with respect to orifices 33. The result of this action is that the particles combine with the principal air stream smoothly and away from the walls of zone 18, as defined by members 19 and 20. It will thus be apparent that the construction of the annular passage 26 and the manner in which the aggregate is directed through orifice 33, provides a relatively even film of solid particles directly fed into the classifying zone in a manner tending to eliminate "blobs" of particles and to provide a more smooth and more completely distributed feed. Any desired number of conduits 27, preferably evenly spaced circumferentially, can be employed to carry the aggregate from hopper 25 to passage 26. The use of two diametrically opposed conduits has been found to produce good results. Likewise, any other suitable means may be employed for feeding the particles into zone 18 to accomplish the above-mentioned purposes.

An important feature of the present invention resides in the effective production and utilization of the tangential or rotational velocity of the blower exhaust in the classifying zone 18. The blower (or pump) 4, (which may be of any other suitable construction, one-stage, dual stage or other polystage), is preferably coaxially located adjacent the classifying zone and in such a manner that the air from the blower can be introduced into the zone 18 through a relatively short annular space 16 around the inside periphery of the casing 1.

Figure 4:
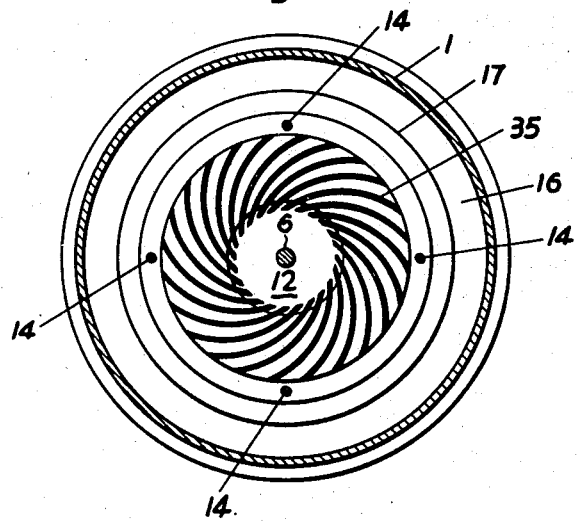
Figure 4 is a sectional plan view taken along line 4—4 of Figure 1.

The blades 35 of the second stage impeller 13, or its equivalent, are preferably curved as shown in Figure 4 to more efficiently produce rotary motion of the desired velocity and pressure in the air in passage 16 and classifying zone 18, for a given rotary speed of the impeller. The first stage impeller 9, together with the straightening vanes 8b (if impeller 9 and vanes 8b are employed, which is optional), serves to provide whatever additional pressure may be desired to produce the desired radial velocity in the fluid. The blades 9a of impeller 9 may be designed in accordance with methods well known in the art, and may be as illustrated.

I have found that it may be advantageous to utilize a bleed line 41 for the purpose of controlling the pressure and volume of air inside the casing. This feature is of importance also to relieve any excessive increase in pressure due to air or other gas introduced through pipe 34. While line 41 is normally open to the atmosphere, it may be connected to pressure control mechanism (not shown) for the more exact control of pressure and/or for isolation of the gas employed within the classifier. The use of such pressure control mechanism makes it possible to operate at atmospheric, super-atmospheric or sub-atmospheric pressure, as desired.

The classifying zone 18 terminates centrally in a downwardly disposed annular passage 21 which is formed between an extension 11a on the passage 11 and the inside walls of the fine particle or fraction collector 42. This construction utilizes the continuing rotation of the fluid as it leaves the classifying zone 18 to separate the particles from the fluid.

In the classifying zone 18, the centrifugal force produced by the rotational velocity of the air and powder is at its maximum near the center of the machine and is counteracted by the drag force of the inwardly flowing air. Both of these forces are directed radially so that the resultant force, whether it be an outward force on the larger particles, or an inward force on the smaller ones, is also in a nearly radial direction. After the air has turned the corner from zone 18 into annular passage 21, the drag force is axial, such as vertical and downward, while the centrifugal force is still in a radial direction. Thus the suspended powder is forced against the walls of collector 42 in an outward direction out of the air stream, which makes a 180° turn after leaving passage 21, to enter the extension 11a.

The coarse fraction collector 3 comprises a conical member supported from the lower edge of casing 1 and terminating in a suitable receptacle 46. The fine fraction collector 42 likewise terminates in a conical section 43 which leads to fine fraction receptacle 44 by means of conduit 45 extending through the wall of collector 3.

The coarse fraction, as indicated before, is directed outwardly from zone 18 so that the coarse particles drop over the edge of member 20 or pass between the periphery of this member and the inside of casing 1 to be deposited in container 46. I have found that it is desirable to locate the supports 47, 48 for member 20 in a position such that minimum interference with the airflow is presented around the radial periphery of member 20. Figure 1 illustrates a desirable manner of mounting these supports which removes them as much as possible from the path of the coarse fraction.

By virtue of the compact coaxial arrangement of the blower 4, classifying zone 18 and fine particle collector 42, in a preferred form of the apparatus, the rotational velocity of the fluid produced by the blower 4 is conserved to a large degree in the fluid as it passes through the classifying zone 18 and the fine particle collector 42, back to the blower 4. In the preferred form the apparatus and process of the invention can be operated in a closed system to the substantial exclusion of outside air or undesirable contaminating moisture or dust. In addition to air, or in place thereof, other gaseous media may be employed, such as nitrogen, carbon dioxide, hydrogen, methane, natural gas and/or flue gases, to advantage in certain cases, and as desired.

Figure 5 is a graph illustrating results obtained in the classification of a glass powder in a classifier of the kind described in which the radial distance from the axis of the classifier to a paraxial line intersecting the outer peripheral edges of the converging walls of members 19 and 20 was approximately 6.5 inches, and the radial distance from the axis to the inner edge of converging wall 20 was approximately 3 inches. The paraxial distance between the opposing outer edges of members 19 and 20 was approximately 1.4 inches, and the closest inner paraxial distance between members 19 and 20 was approximately 0.3 inch. The opposed surfaces of members 19 and 20 were substantially frusto-conical in shape.

The glass powder, which had a density of 2.5 and a particle distribution ranging between approximately 5 and 60 microns, was fed into the classifier at the rate of approximately 32 pounds per hour. The flow rate of air in the classifier was approximately 130 cubic feet per minute, and the blower speed was approximately 4000 revolutions per minute.

In Figure 5 the ordinate (plotted rectangularly) represents the cumulative per cent by weight of powder having particles of diameters less than the diameter shown by the abscissa which represents particle diameter (plotted logarithmically). Curve A represents the feed powder, and curves B and C represent the fine fraction and the coarse fraction, respectively, produced in the above-mentioned run. The fine fraction contained about 62 per cent of the feed powder and the coarse fraction about 38 per cent. Curves D and E represent the fine and coarse fractions, respectively, which would be produced by a perfect classifier cutting at the 62 per cent point (i. e. to produce the same weight fractions as in the above actual case).

Taking a particle diameter of 35 microns as a reference point, it will be noted that the fine fraction contained only approximately 20 per cent of material of particle size greater than 35 microns, of which the largest particles were not greater than about 48 microns, and that the coarse fraction contained only 40 per cent of material of particle size less than 35 microns, of which the smallest particles were not smaller than about 21 microns. By present day standards of particle classification obtainable by commercially available machines, these results are excellent.

Although an embodiment of the apparatus of the invention has been particularly described using two impellers, a single impeller or a larger number of impellers may be used, this being largely a matter of blower design as will be understood. Thus any other blower or pump suitable for the purpose may be substituted.

Thus the impeller blades 35 may have any design or shape suitable for the purpose of setting the fluid in rotation. The straightening vanes 8b or their equivalent, when employed, may likewise be of any design or shape, or be in any position relative to the impeller such that the rotating fluid is at least partially compressed as it passes through the vanes.

Likewise, vanes, which may be made adjustable if desired, may be positioned at any desired point or points downstream of impeller 13 and upstream of classifying zone 18, to increase or decrease, as desired, the rotational velocity of the fluid medium in passage 16 and/or classifying zone 18, as will be readily understood.

While preferred modifications of the invention have been disclosed, it will now be obvious to those skilled in the art that further modifications may be made and the features of one modification may be utilized with or in substitution for other features of other modifications, or otherwise, all within the scope of the appended claims.

I claim:

1. A particle classifier comprising a blower having an annular outlet around the outer ends of its blades, a circumferential classifying chamber having end walls extending inwardly from a generally round periphery and an annular inlet about its periphery between said end walls, an annular conduit having an annular inlet connected annularly to said annular outlet of said blower to receive from said blower a fluid in rotary motion and an annular outlet positioned around and communicating with said annular inlet of said circumferential classifying chamber to deliver said fluid while in rotary motion to said classifying chamber, a particle outlet at the periphery of said classifying chamber, and a fluid suspension outlet for said classifying chamber positioned about the center thereof.

2. Apparatus in accordance with claim 1, wherein the blower is a two-stage blower.

3. Apparatus in accordance with claim 1, wherein the blower comprises a centrifugal impeller having a plurality of blades arcuately shaped so as to efficiently produce rotational motion in a fluid during rotation of said impeller.

4. Apparatus in accordance with claim 1, wherein the blower, classifying chamber, and the outlets for the classifying chamber are arranged coaxially with respect to a circumferential casing.

5. A particle classifier comprising a blower having an annular outlet around the outer end of its blades, a circumferential classifying chamber having end walls extending inwardly from a generally round periphery and an annular inlet about its periphery between said end walls, an annular conduit having an annular inlet connected annularly to said annular outlet of said blower to receive from said blower a fluid in rotary motion and an annular outlet positioned around and communicating with said annular inlet of said circumferential classifying chamber to deliver said fluid while in rotary motion to said classifying chamber, a particle outlet at the periphery of said classifying chamber, an annular outlet for said fluid having particles suspended therein communicating with said classifying chamber about the center thereof, a centrifugal cyclone collector positioned about the central axis of said classifying chamber and adjacent said chamber and having an annular inlet, and means for connecting said annular inlet of said centrifugal cyclone collector to said annular outlet for said classifying chamber to deliver said fluid suspension while in rotary motion to said centrifugal cyclone collector.

6. A particle classifier comprising a blower having an annular outlet around the outer ends of its blades, a circumferential classifying chamber having an annular inlet about its periphery and comprising a classifying zone having a pair of juxtaposed substantially frusto-conical members, an annular conduit having an annular inlet connected annularly to said annular outlet of said blower to receive from said blower a fluid in rotary motion and an annular outlet positioned around and communicating with said annular inlet of said circumferential classifying chamber to deliver said fluid while in rotary motion to said classifying chamber, a particle outlet at the periphery of said classifying chamber and an outlet for said fluid having particles suspended therein communicating with said classifying chamber about the center thereof.

7. Apparatus in accordance with claim 6, wherein at least one of said juxtaposed frusto-conical members is provided with an annular inlet passage for feed particles positioned radially intermediate the ends thereof.

8. Apparatus in accordance with claim 6, wherein said pair of juxtaposed substantially frusto-conical members are replaced by a pair of juxtaposed substantially frusto-paraboloidal members.

9. Apparatus in accordance with claim 6, wherein said pair of juxtaposed substantially frusto-conical members are replaced by a pair of juxtaposed substantially frusto-spherical members.

10. A particle classifier comprising a blower having a central inlet and an annular outlet around the ends of its blades, a circumferential classifying chamber having end walls extending inwardly from a generally round periphery and an annular inlet about its periphery between said end walls, an annular conduit having an annular inlet connected annularly to said annular outlet of said blower to receive from said blower a fluid in rotary motion and an annular outlet positioned around and communicating with said annular inlet of said circumferential classifying chamber to deliver said fluid while in rotary motion to said classifying chamber, a particle outlet at the periphery of said classifying chamber, an annular outlet for said fluid having particles suspended therein communicating with said classifying chamber about the center thereof, a centrifugal cyclone collector positioned about the central axis of said classifying chamber and adjacent said chamber on the opposite side thereof from said blower, said centrifugal cyclone collector having an annular inlet, means for connecting said annular inlet of said centrifugal cyclone collector to said annular outlet for said classifying chamber to deliver said fluid suspension while in rotary motion to said centrifugal cyclone collector, a tubular passage positioned about the central axis of said classifying chamber and extending therethrough into said centrifugal cyclone collector, said passage having an inlet positioned within said centrifugal cyclone collector to receive from said collector the fluid of said suspension while still in rotary motion, and an outlet for said passage connected to said central inlet of said blower to deliver said fluid while still in rotary motion to said blower.

11. A particle classifier comprising a cylindrical casing, a closure for the upper end of said casing, a blower journaled in said closure, a radially extending impeller in said blower, a classifying chamber coaxially mounted in the casing below said blower, said chamber comprising upper and lower substantially frusto-conical surfaces in spaced relation to each other and to the inner wall of said casing, a housing for said impeller, said housing extending radially within the casing and terminating short of the casing walls to provide a passage for exhaust air, an annular sleeve connecting the outer edge of said housing with the upper frusto-conical surface to provide an annular passage between the impeller and the classifying chamber, a second sleeve forming a central passage from the classifying chamber to the blower for return air, an annular feed passage in the conical surface of the upper classifying chamber member, means for introducing feed aggregate to said annular feed passage, a collector attached to the bottom of the casing and having an inlet about the periphery of the lower conical classifying chamber member, and a second collector centrally aligned with a central opening in the lower classifying chamber member, said second sleeve extending down into said second collector through said last-mentioned opening, and said second collector being in coaxial registry with the said second sleeve.

References Cited in the file of this patent

UNITED STATES PATENTS

| 416,124 | Reeves | Nov. 26, 1889 |
| 1,761,627 | Hine | June 3, 1930 |
| 2,032,827 | Andrews | Mar. 3, 1936 |
| 2,169,680 | Crites | Aug. 15, 1939 |
| 2,188,634 | Sturtevant | Jan. 30, 1940 |
| 2,276,761 | Carey | Mar. 17, 1942 |
| 2,329,299 | Rourke | Sept. 14, 1943 |
| 2,338,779 | Mutch | Jan. 11, 1944 |
| 2,546,068 | Gustavsson | Mar. 20, 1951 |

FOREIGN PATENTS

| 506,488 | Great Britain | May 30, 1939 |
| 544,397 | Great Britain | Apr. 10, 1942 |